Nov. 25, 1952　　　　C. D. RICE　　　　2,619,051

DOUGH DIVIDER FOR BAKERIES

Filed March 1, 1949

INVENTOR.
CURTIS D. RICE
BY
Wheeler, Wheeler & Wheeler
ATTORNEYS

Patented Nov. 25, 1952

2,619,051

UNITED STATES PATENT OFFICE 2,619,051

DOUGH DIVIDER FOR BAKERIES

Curtis D. Rice, Kalamazoo, Mich.

Application March 1, 1949, Serial No. 78,948

14 Claims. (Cl. 107—21)

This invention relates to a dough divider for bakeries.

It is the primary object of the invention to provide a satisfactorily operable means for dividing a long strip or ribbon of dough into small units by mechanical means. In the past, the cutting of the dough has usually been done by hand, numerous attempts to do the work mechanically having failed, due to the difficulty of freeing a cutting knife from the dough. Previous efforts to solve the problem have usually involved the retraction of the knife through a slotted stripping device, but the dough tends to accumulate on such a device, ultimately clogging the apparatus.

It is the purpose of the present invention to solve the problem by confining the dough between two conveyors, one of which is a light and flexible belt which can be forced by the dividing blade through the dough to effect a division thereof into component sections, the blade itself never coming in contact with the dough. In this connection, it is a further object of the invention to provide means whereby the belt which enshrouds successive dividing blades during the dough dividing operations is fed to the blades with sufficient slack to accommodate the displacement brought about by the entry of the blade and belt into the body of dough, the subsequent tensioning of the belt upon leaving the blades comprising a means of discharging the separated masses of dough from contact with the belt.

Filed herewith of even date, namely, March 1, 1949, are my companion applications entitled, Machine for Preparing Dough for the Manufacture of Filled Bakery Goods, Serial No. 78,947, and Dividing Wheel Having Movable Blades for Pinching Off Portions of a Relatively Advancing Ribbon of Dough or the Like, Serial No. 78,946. I have, in the case of Serial No. 78,947, disclosed a mechanism for tensioning and flattening dough to form an elongated continuous ribbon and, in the case of Serial No. 78,946, disclosed a mechanism which relates to a dividing wheel having movable blades, in which each blade is so movable as to take advantage of the adhesion of the dough to its conveyor and to the successive blade, to permit the blade in advance of the separated dough portion to move clear thereof by oscillating with respect to the dividing wheel upon which it is mounted. The present machine, as well as that of Serial No. 78,946, acts on a continuous ribbon of dough, such as for example, that produced by the machine in Serial No. 78,947, in a subsequent operation to divide the dough ribbon into small loaves or sections, as will be more fully apparent with reference to the accompanying drawings, wherein Fig. 1 is a view in longitudinal section through dough dividing mechanism embodying the invention and constituting a fragmentary part of more extensive dough handling apparatus.

Figure 1:
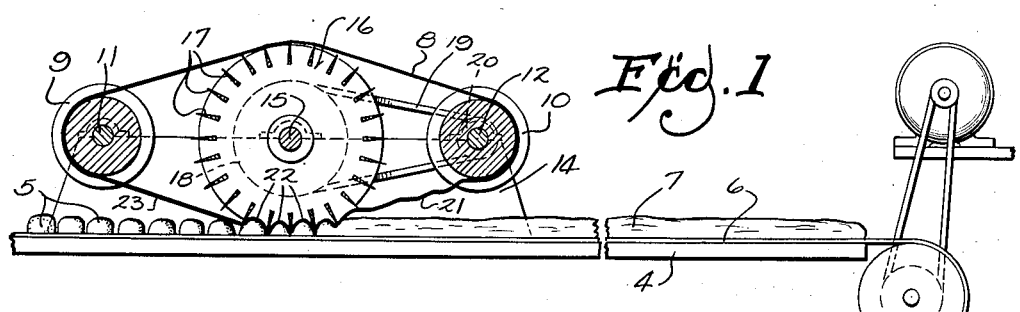

I have shown at 4 the frame of a dough handling machine which comprises a table on which the conveyor 6 operates to convey the ribbon 7 of dough which is to be divided into the component loaves or portions 5. The ribbon of dough may be of any desired width up to the full width of the conveyor 6, which desirably comprises a belt.

At the point of division, the ribbon of dough is confined between the conveyor 6 and a relatively lightweight conveyor belt 8 which should be as wide as the ribbon 7 but need not be materially wider. The belt 8 operates over pulleys 9 and 10 mounted on shafts 11 and 12, respectively, for which the brackets 13 and 14 provide bearings.

Intermediate shafts 11 and 12 is a shaft 15 on which divider wheel 16 is supported. This wheel comprises a series of generally radial blades at 17 which may be brought to relatively sharp edges, the radius of the wheel 15 from the shaft being such that the successive blades approach very closely to conveyor 6 and are thereby required to penetrate the ribbon of dough 7 so that as the ribbon of dough passes beneath the divider wheel 16 on the conveyor 6, the wheel will be caused to rotate and to force the successive blades to penetrate completely through the dough.

Figure 2:
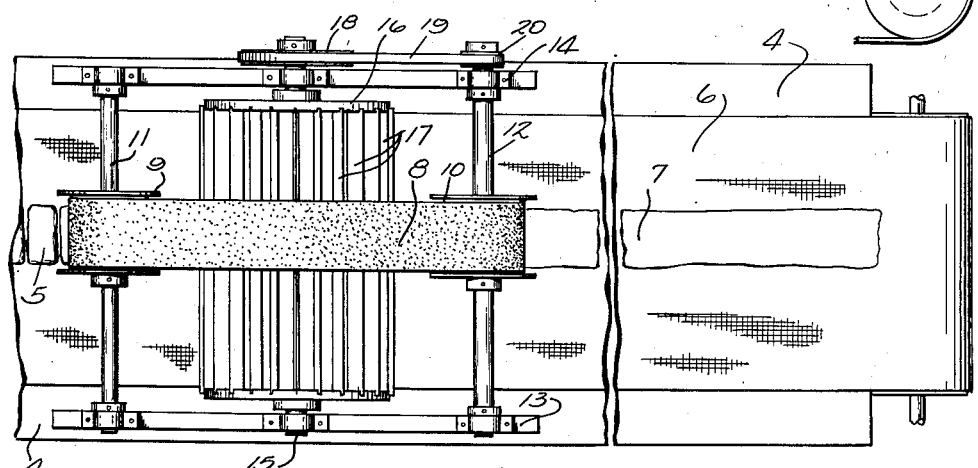
Fig. 2 is a plan view of the mechanism shown in Fig. 1.

As clearly shown in Figs. 1 and 2, the lower run of the endless conveyor belt 8 passes beneath the several blades 17 in registry with the ribbon of dough so that it is the lower run of belt 8, rather than the blades themselves, which is forced by the blades through the dough and into contact with the conveyor 6, thereby dividing the dough into the component portions 5.

The shaft 15 may desirably be provided with driving connections to shaft 12. As illustrated, and by way of example, these connections may include a pulley 18, belt 19 and pulley 20, the ratio of the pulleys being such that the peripheral speed of the pulley 10 on the driven shaft 12 slightly exceeds the peripheral speed of the dividing wheel 16, whereby to tension the upper run of belt 8 and to provide considerable slack in the portion 21 of the lower run of said belt. As the belt is forced by the successive blades 17 downwardly through the ribbon of dough, displaced portions of the dough enter between the blades, bulging the belt upwardly between its points of engagement on the edges of the blades, the upward bulging of the belt under pressure of the dough being shown at 22 in Fig. 1. The same accelerated movement of pulley 10, as compared with the dividing wheel 16, causes the tension of the upper run of the belt to be communicated over the idler pulley 9 to the portion 23 of the lower run of the belt whereby, as the belt withdraws the dough from the blades, the belt is drawn taut, thereby eliminating the upward bulges and ejecting the separated portions 5 of dough.

Figure 3:
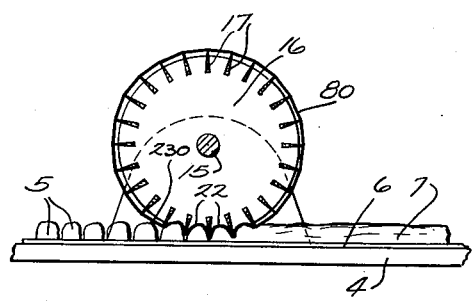
Fig. 3 is a view in longitudinal section through a modified embodiment of the invention.
Figure 4:
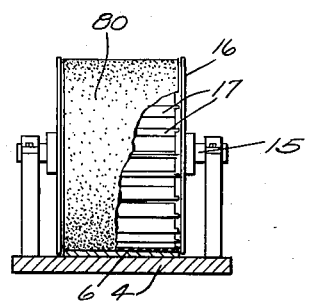
Fig. 4 is a view in end elevation of the device shown in Fig. 3, portions of the belt being broken away.

In the construction shown in Figs. 3 and 4, the dividing wheel 16 remains unaltered, being provided with blades 17 as above described. The pulleys 9 and 10 and their supporting shafts have, however, been dispensed with and the belt 80 is applied directly over the blades with only sufficient slack to form the bulges at 22 under pressure of the dough admitted between the blades. As soon as this pressure is relieved at any given inter-blade channel, the pressure of the dough applied in another channel to which the dough is just being admitted will draw the belt taut as indicated at 23 to eject the formed portion or lobe which has been separated from ribbon 7. As in the device previously described, the forming wheel 16 is driven from the conveyor 6. Just as already described, the dough is confined between the conveyor 6 and the belt 80 during separation, the latter belt being forced through the dough into substantial contact with conveyor 6 to achieve the division, and the dough later being ejected by the tensioning of belt 80 from the inter-blade space into which it has bulged during separation.

While the conveyors or belts herein disclosed may be made of a wide variety of materials, I have found it perfectly satisfactory to use canvas belts of relatively fine mesh. Such a belt is preferred for belt 6 but a pure latex belt is desirable at 8 (and belt 80) as it folds readily round the margin of each divider blade, forming, in effect, a lamination on both faces of the respective blades as they enter the dough to pinch off the portions to be separated from the ribbon. The rapid change in form of the belt from the bulge shown at 22 to the rectilinear run under tension at 23 is of great assistance in completely freeing the belt from the dough.

It is, of course, broadly immaterial whether the dividing wheel is operated, as shown, by relative movement between the wheel and the work. However, the arrangement disclosed in Figs. 1 and 2 is the most satisfactory that is known to me.

I claim:

1. A machine for dividing a ribbon of dough or the like into separate portions, said machine comprising a dividing wheel having peripherally spaced outwardly projecting blades as wide as the ribbon to be divided, a support for the wheel, a support for the said ribbon to dispose said ribbon in the path of wheel rotation, means for effecting relative movement between said supports, and a flexible web substantially as wide as the ribbon of dough and encircling the bladed wheel, whereby to be intervening between said blades and ribbon to be forced by successive blades through said ribbon to pinch off the portions to be separated therefrom.

2. The device of claim 1 in which said web is endless.

3. The device of claim 2 in which the endless web has sufficient slack to enfold itself upon the respective blades when forced into the ribbon.

4. The device of claim 3 in which the said web is subject to sufficient tension to eject from between said blades the portions of a ribbon pinched off by penetration of the respective blades and enfolded web into the ribbon.

5. The device of claim 4 in which the web is provided with a guide about which said web passes from above the wheel and from which said web moves into engagement with said ribbon, the said guide comprising a pulley having means for its actuation at a web tensioning speed and direction, whereby to deliver slack web beyond said pulley to be received with portions of said ribbon between said blades.

6. A machine for dividing successive portions from a ribbon of dough or the like, said machine comprising a ribbon support, a bearing support at a substantially fixed distance from the ribbon support, means for effecting relative movement of one of said supports respecting the other, a dividing wheel rotatably mounted on the bearing support and comprising peripherally spaced blades of generally axial extent and generally radial projection and as wide as the ribbon to be divided, said blades having free margins at such radius from the axis of rotation of said wheel as to be cooperative with the ribbon support in the course of wheel rotation, and an endless flexible belt extending about said wheel and blades and having sufficient slack to be bulged between and enfolded upon said blades in penetrating a ribbon on the ribbon support, the belt being substantially as wide as the ribbon of dough and of such length as to free itself of the bulges formed by separated portions of said ribbon and to eject such portions as the blades move away from the ribbon support in the rotation of said wheel.

7. The device of claim 6 in which the belt is provided with a guide pulley spaced from said wheel, said pulley being provided with means for actuating it in the direction of web advance and at a rate to tension the web moving toward the pulley to facilitate ejection of separated portions of the ribbon, and to provide slack in the part of said belt moving toward the point of interaction between the blades and the ribbon support.

8. The device of claim 7 in which the said pulley is at the side of the wheel from which the ribbon has relative advance to the wheel, the said belt being further provided with an idler pulley at the opposite side of said wheel from the pulley first mentioned and over which said belt is tensioned to assist in the ejection from between the blades of said wheel of portions of said ribbon separated by the penetration of such blades and belt portions enfolded thereabout.

9. The combination with a dough conveyor for strips of dough to be divided, of a coacting divider wheel provided with peripherally spaced radial blades of like radius and as wide as the strips to be divided, and an endless flexible belt also as wide as said strips and encircling the divider wheel and blades and including sufficient slack to be bulged between said blades by portions of the dough divided thereby, the said wheel being provided with a mounting substantially fixed above the path of said conveyor at a radius such that successive blades and belt portions enfolded thereon will encounter the belt with substantial pressure sufficient to pinch off portions of dough between the blades.

10. The device of claim 9 in further combination with pulleys at each side of said wheel and over which said belt is operable, the pulley at the side of the wheel from which said conveyor moves toward the wheel being provided with driving connections from said wheel.

11. In a device of the character described for sub-dividing a doughy strip of work, the sub-combination which comprises a dividing wheel having radial work-dividing blades and a wide, thin endless flexible belt encircling the wheel and all active portions of said blades and having slack portions receivable between the blades, whereby said belt intervenes between the blades and all work divided thereby.

12. The device of claim 11 in which said belt closely encircles the wheel.

13. The device of claim 11 in which said belt is provided with belt tensioning means disposed between it and the wheel at one side thereof.

14. The device of claim 11 in further combination with a belt driving pulley at one side of the wheel and about which the belt passes, the pulley having means for operating it at a rate to tension the belt at one side of the wheel and to accumulate the belt slack at the other.

CURTIS D. RICE.

REFERENCES CITED

The following references are of record in the file of this patent:

UNITED STATES PATENTS

| Number | Name | Date |
|---|---|---|
| 89,985 | Gray | May 11, 1869 |
| 496,286 | Thompson | Apr. 25, 1893 |
| 785,786 | Wolff | Mar. 28, 1905 |
| 2,232,832 | Walborn | Feb. 25, 1941 |
| 2,410,744 | Powers | Nov. 5, 1946 |